(12) United States Patent
Verschuren

(10) Patent No.: US 8,884,848 B2
(45) Date of Patent: Nov. 11, 2014

(54) DRIVER FOR AN OLED DEVICE

(75) Inventor: Coen A. Verschuren, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 218 days.

(21) Appl. No.: 13/320,027

(22) PCT Filed: May 5, 2010

(86) PCT No.: PCT/IB2010/051962
§ 371 (c)(1),
(2), (4) Date: Nov. 11, 2011

(87) PCT Pub. No.: WO2010/131160
PCT Pub. Date: Nov. 18, 2010

(65) Prior Publication Data
US 2012/0056868 A1 Mar. 8, 2012

(30) Foreign Application Priority Data
May 12, 2009 (EP) ..................................... 09159982

(51) Int. Cl.
*G09G 3/30* (2006.01)
*H05B 33/08* (2006.01)
*G09G 3/00* (2006.01)

(52) U.S. Cl.
CPC ............ *H05B 33/0896* (2013.01); *G09G 3/006* (2013.01); *G09G 3/3206* (2013.01); *G09G 2310/0256* (2013.01); *G09G 2320/0295* (2013.01); *G09G 2330/08* (2013.01)
USPC ........................... 345/76; 345/212; 315/169.3

(58) Field of Classification Search
USPC ........... 345/212, 76, 88, 77; 315/169.1–169.4
See application file for complete search history.

(56) References Cited

U.S. PATENT DOCUMENTS

| | | | | |
|---|---|---|---|---|
| 6,633,135 B2 * | 10/2003 | Nara et al. | ................. | 315/169.3 |
| 7,586,265 B2 * | 9/2009 | Heuser et al. | ............... | 315/169.3 |
| 8,294,644 B2 * | 10/2012 | Marx et al. | ...................... | 345/82 |
| 2002/0047565 A1 | 4/2002 | Nara et al. | | |
| 2003/0001828 A1 | 1/2003 | Asano | | |
| 2004/0160167 A1 | 8/2004 | Arai et al. | | |

(Continued)

FOREIGN PATENT DOCUMENTS

| | | |
|---|---|---|
| CN | 1462371 | 12/2003 |
| WO | 02093186 A1 | 11/2002 |
| WO | 03052446 A1 | 6/2003 |
| WO | 2004042413 A1 | 5/2004 |

*Primary Examiner* — Abbas Abdulselam
(74) *Attorney, Agent, or Firm* — Yuliya Mathis

(57) ABSTRACT

A driver (30) for driving an OLED (20) comprises: output terminals (31, 32); —a current sensor (35) sensing the output current; —a sensor input (33) coupled to the current sensor; —a reference signal source (36) providing a reference signal (Sref) indicating a threshold current level (Ith). In a normal operating state (N), a normal operating voltage ($V_N$) and a normal operating current ($I_N$) are generated. In a measuring state (M), a measuring voltage ($V_M$) lower than the normal operating voltage is generated, the sensor signal is compared with the reference signal, and it is determined whether the OLED current is higher than said threshold current level. In a healing state (H), a healing voltage signal ($V_H$) is generated. If it is determined that the OLED current is higher than said threshold current level, the driver is designed to briefly operate in the healing state.

11 Claims, 4 Drawing Sheets

(56) References Cited

U.S. PATENT DOCUMENTS

| | | | |
|---|---|---|---|
| 2004/0164939 A1* | 8/2004 | Johnson et al. | 345/82 |
| 2004/0227706 A1 | 11/2004 | Sung | |
| 2005/0030257 A1* | 2/2005 | Greuel et al. | 345/55 |
| 2006/0015272 A1* | 1/2006 | Giraldo et al. | 702/58 |
| 2007/0120783 A1 | 5/2007 | Osame et al. | |
| 2007/0242003 A1 | 10/2007 | Vogel et al. | |
| 2008/0111812 A1* | 5/2008 | Shirasaki et al. | 345/212 |
| 2011/0074751 A1* | 3/2011 | Jiang et al. | 345/207 |

* cited by examiner

DRIVER FOR AN OLED DEVICE

FIELD OF THE INVENTION

The present invention relates in general to OLED devices, and more particular to a driver for such devices.

BACKGROUND OF THE INVENTION

OLED (organic light emitting diode) devices are commonly known, so a detailed explanation is not necessary here. Suffice it to say that an OLED comprises a layer of a special type of polymer or small molecules, arranged between a cathode layer and an anode layer. When a voltage is applied between these cathode and anode layers, the intermediate OLED layer emits light (in contrast to an inorganic LED on the basis of PN junctions, which typically behaves as a point source).

FIG. 1A is a graph illustrating the current (vertical axis) versus voltage (horizontal axis) characteristic of an OLED having normal behavior. When the device is OFF, the voltage is zero and the current is zero. When the device is switched ON, the voltage rises and so does the current. The precise shape of the current/voltage curve may be device dependent, but in general the current is negligibly small in a first voltage range (in the example of FIG. 1A, the current remains below 0.1 μA for a voltage from zero up to about 2,5 V), and then the current quickly rises to reach a value of about 1 mA at about 4 V, when the device is considered to be ON. A device showing such normal behavior will in the context of the present invention be indicated as a "healthy" device, and it will be considered to be in a "healthy condition".

A problem with OLEDs is that an OLED can be in a faulty condition; such device will in the context of the present invention be indicated as a "faulty" device. FIG. 1B is a graph similar to FIG. 1A, illustrating the current versus voltage characteristic of a faulty OLED (curve 2). For sake of easy comparison, the characteristic of a healthy OLED is also shown in this figure (curve 1). For voltages higher than the first voltage range, there is no visible difference, but for voltages in the first voltage range the current is substantially higher, for example a few to several tens of times, in extreme cases (as illustrated in FIG. 1) even in the order of 100×-1000×, for a faulty OLED as compared to a healthy OLED. In the following, the current for a faulty device will be indicated as "faulty current" while the current for a healthy device will be indicated as "healthy current".

It is noted that, at least in principle, any OLED can make a transition from a healthy state to a faulty state. The difference between faulty current and healthy current level may differ between different OLEDs. In the example of FIG. 1B, the faulty current is lower for voltages just above the first voltage range as compared to voltages in the first voltage range, but this does not necessarily apply to all OLEDs.

It is further noted that, in practice, an OLED is either ON or OFF, and it will be in the transition from ON to OFF or back for only a very brief moment of time. Thus, at first sight it may seem that the problem is not severe, since in the ON state the current is the same for a faulty device. However, when an OLED is in its faulty state, its lifetime can be reduced substantially. This effect is believed to be caused by the fact that the current is not evenly distributed over the device's surface but is flowing only locally, leading to very high local current densities capable of locally destroying the device.

The present invention aims to increase the reliability and lifetime of OLEDs.

Whereas the above-described effect can be compared to some kind of short-circuiting in the device, one solution might be to remedy the short-circuit location after it has already occurred. However, this will most likely lead to a defective spot in the device (dark spot). In contrast, the present invention tries to prevent such short-circuiting from occurring, or at least reduce the chances on its occurrence.

SUMMARY OF THE INVENTION

The inventor has found that, in an early stage, it is possible to cause the device to make a transition from the faulty state back to the healthy state by applying a suitable voltage signal. This voltage signal will be indicated as a "healing" signal. The exact parameters of this healing voltage signal will be type-dependent and/or device dependent, but can in any case be specified by a manufacturer and can be considered as a device-property of the OLED.

The inventor has further found that it is possible to measure whether an OLED is faulty or healthy, by performing a measurement based on the characteristics visualized in FIG. 1B.

Based on this insight, the present invention proposes, during operation in the ON state, to regularly measure whether an OLED is faulty or healthy, and to apply one or more healing signals if it is found that the OLED is faulty.

Further advantageous elaborations are mentioned in the dependent claims.

BRIEF DESCRIPTION OF THE DRAWINGS

These and other aspects, features and advantages of the present invention will be further explained by the following description of one or more preferred embodiments with reference to the drawings, in which same reference numerals indicate same or similar parts, and in which.

DETAILED DESCRIPTION OF THE INVENTION

Figure 1A:
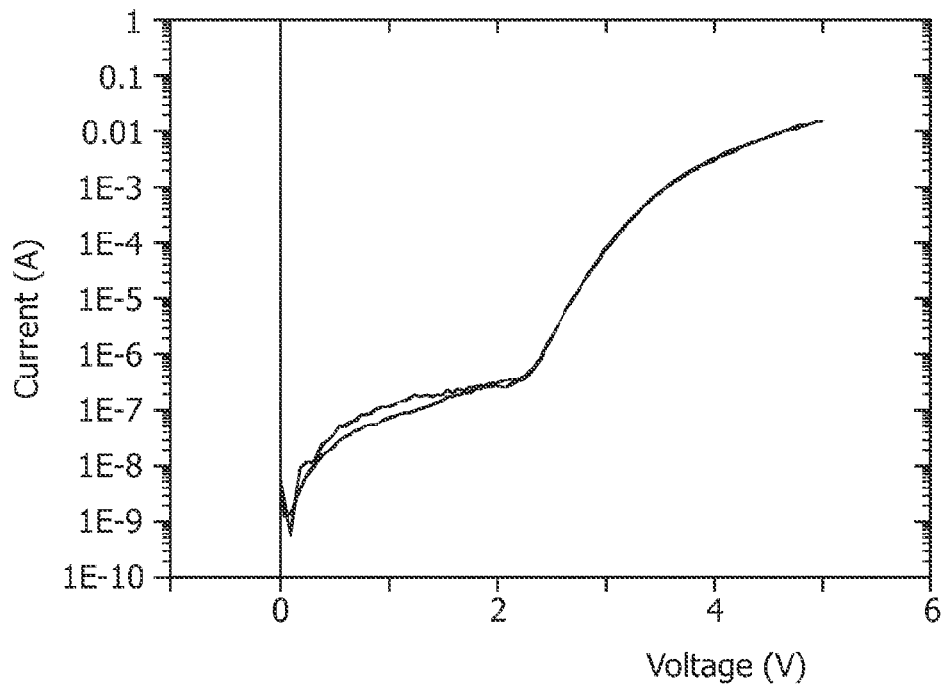
FIGS. 1A and 1B are graphs illustrating the current/voltage characteristic of an OLED.
Figure 1B:
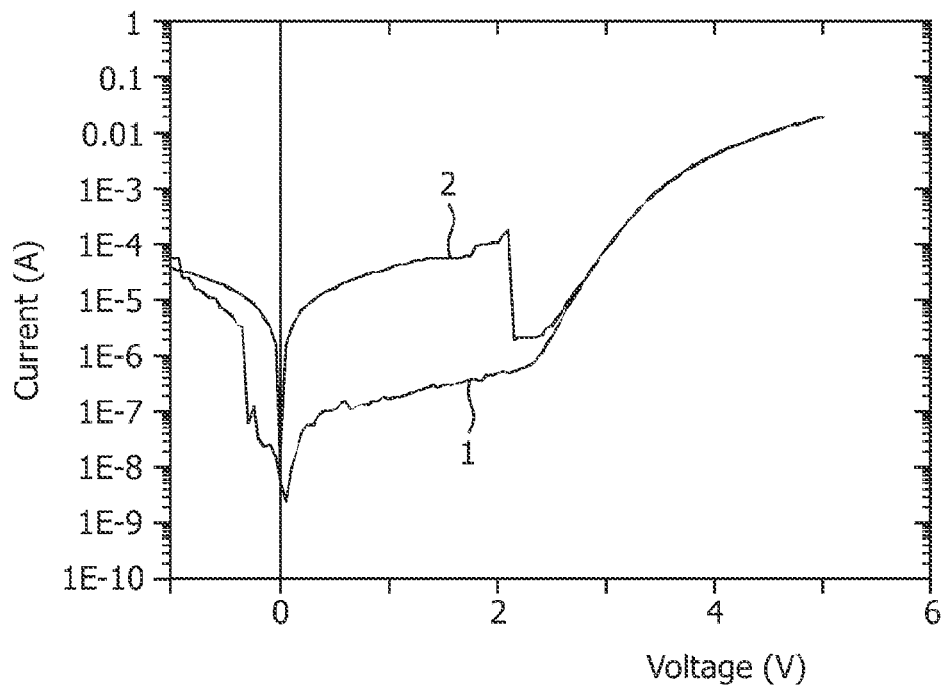
Figure 2:
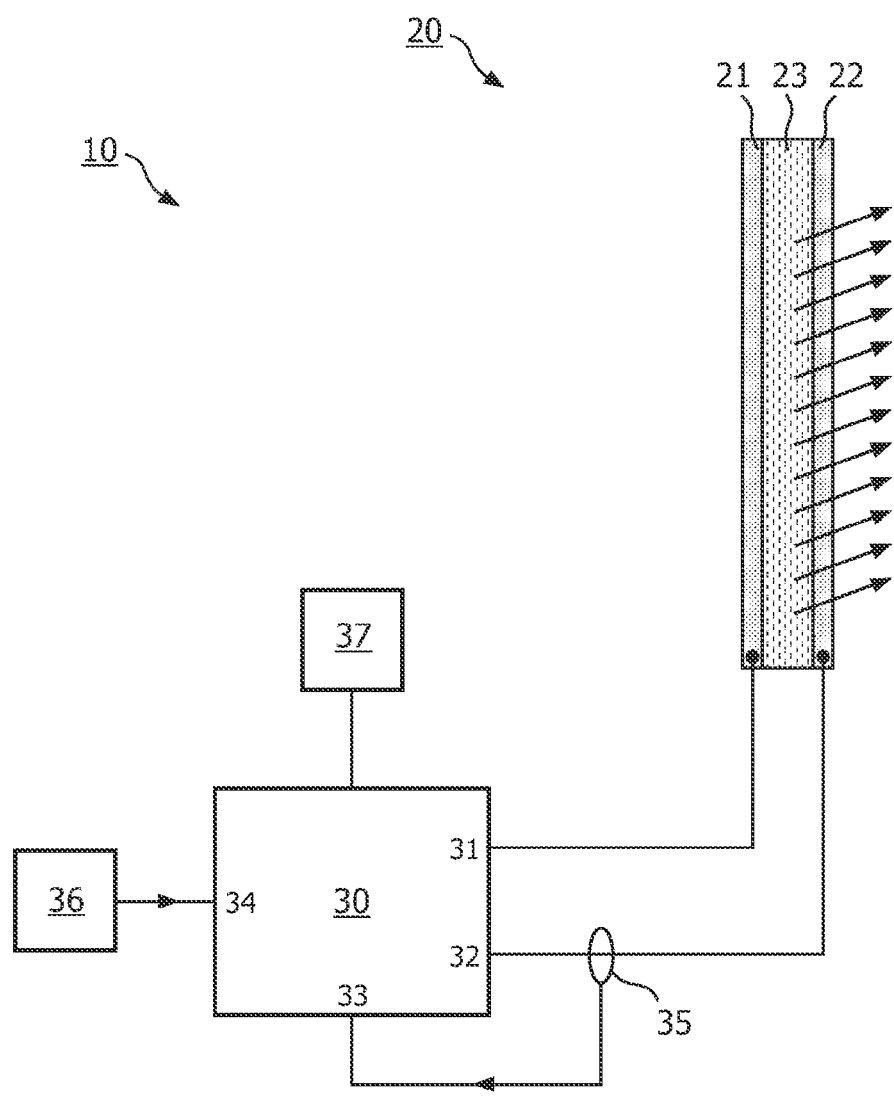
FIG. 2 is a block diagram schematically illustrating an illumination device comprising an OLED and a driver.

FIG. 2 schematically shows an illumination device 10 comprising an OLED 20 and a driver 30. The OLED 20 comprises a light-emitting layer 23 of polymer or small molecules, arranged between an anode layer 21 and a cathode layer 22. Since OLEDs are known per se, a further explanation is not needed here. The driver 30 has output terminals 31, 32 connected to the anode 21 and cathode 22, respectively.

The driver 30 may be supplied from mains (AC) or a battery (DC), but this is not relevant for the present invention and not shown. In any case, the driver 30 is capable of generating at its output terminals 31, 32 a suitable voltage and current for driving the OLED 20. The device 10 comprises a current sensor 35 coupled to a sensor input 33 of the driver 30, for measuring the OLED current I. The driver further has a reference input 34 receiving a reference signal Sref indicating a threshold current level Ith, of which the function will be explained later. It is noted that the current sensor 35 is shown as an external component, but this sensor may also be integrated in the driver 30. A similar remark applies to a reference signal source 36 providing the reference signal Sref.

Figure 3A:
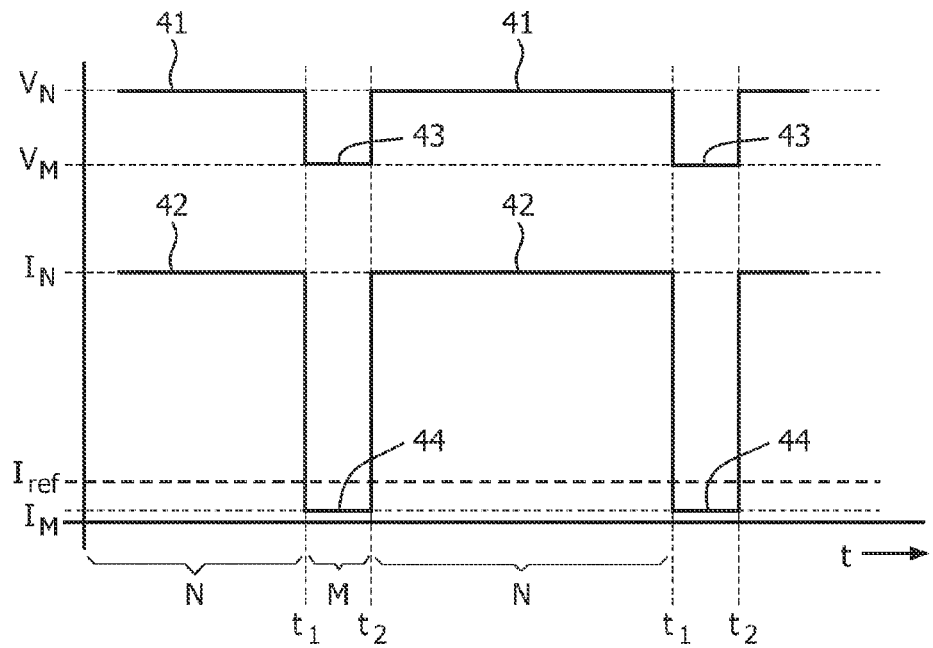
FIGS. 3A and 3B are time diagrams schematically illustrating the operation of a driver in accordance with the present invention.
Figure 3B:
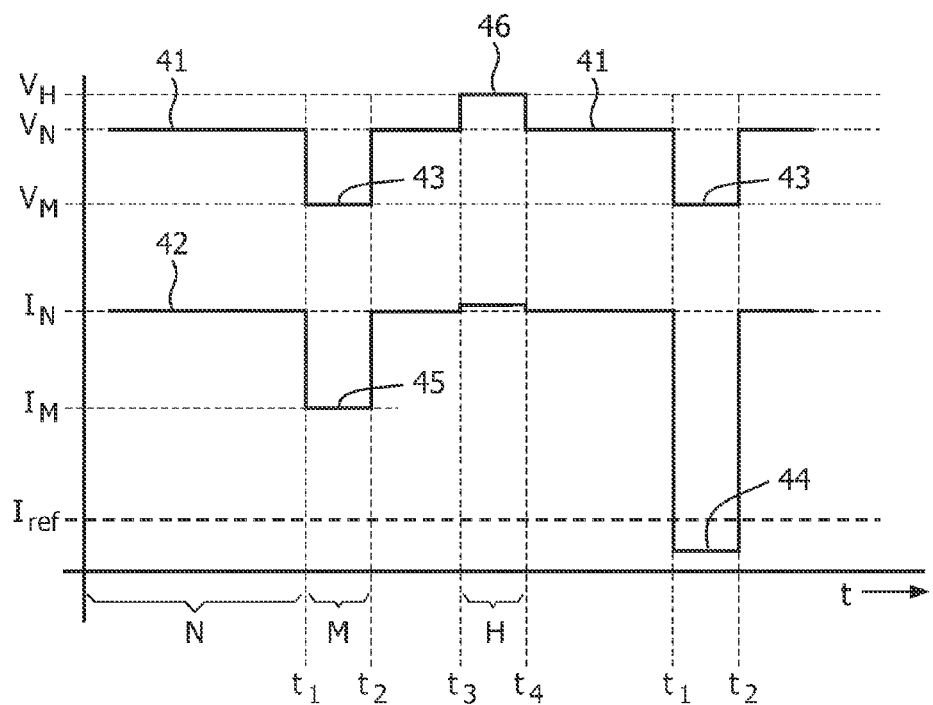

FIGS. 3A and 3B are time diagrams schematically illustrating the operation of the driver 30 in accordance with the present invention when the OLED is ON. The driver is capable of operating in a normal operating state, indicated at N in FIG. 3A and 3B. When operating in the normal operating state, the driver 30 generates a normal operating voltage $V_N$, which may for instance be 4 V (horizontal line 41), and the OLED 20 draws a normal operating current $I_N$, which may for instance be 1 mA (horizontal line 42).

The driver is also capable of operating in a measuring state, indicated at M in FIGS. 3A and 3B. The driver is designed, at regular intervals, to switch over from its normal operating state to its measuring state (at time t1 in FIGS. 3A and 3B) and, after having briefly operated in the measuring state, to switch back to the normal operating state (at time t2 in FIGS. 3A and 3B). The measuring intervals, i.e. the duration from t1 to t2, are as short as possible, in any case shorter than 20 ms in order to prevent noticeable visual effects such as flicker. The measuring repetition frequency, or, conversely, the time distance between successive measuring states, is not critical and is not necessarily constant; for instance, this measuring is done once per second, but it may also be done more often, for instance 5 times per second, or less often, for instance once every 5 seconds or even less.

When operating in the measuring state, the driver 30 generates a measuring operating voltage $V_M$ (horizontal line 43) within the first voltage range mentioned earlier. A suitable value will typically be in the range of 0.5-2 V. At this low voltage, the OLED is "almost off"; the OLED current in this measuring state will be indicated as measuring current $I_M$.

When the OLED 20 is a healthy OLED, the measuring current $I_M$ will be very low, typically in the order of 1-100 nA. This is illustrated in FIG. 3A (horizontal line 44). When the OLED 20 is a faulty OLED, the measuring current $I_M$ will be higher, typically in the range of 1-100 μA. This is illustrated in FIG. 3B (horizontal line 45). The threshold current level Ith is set to be in between these two values. The driver 30 is designed to compare the sensed measuring current $I_M$ (output signal from sensor 35) with the threshold current level Ith. If the sensed measuring current $I_M$ is lower than the threshold current level Ith, the driver 30 decides that the OLED 20 is a healthy OLED and continues operation as usual, i.e. continues operating in the normal operating state until a next measuring state (see FIG. 3A).

The driver is also capable of operating in a healing state, indicated at H in FIG. 3B. If the sensed measuring current $I_M$ is higher than the threshold current level Ith, the driver 30 decides that the OLED 20 is a faulty OLED and decides to switch over to the healing state (at t3 in FIG. 3B). Depending on how quickly the driver 30 can process the comparison results, it may switch over to the healing state immediately after terminating the measuring state, i.e. t3 may be equal to t2, but this is not necessary and the figure shows a time delay between t2 and t3. It is preferred that the driver 30 switches over to the healing state before the next measuring state, although this would not necessarily be essential.

After having briefly operated in the healing state, the driver 30 switches back to the normal operating state (at time t4 in FIG. 3B). The healing intervals, i.e. the duration from t3 to t4, are as short as possible, in any case shorter than 20 ms in order to prevent noticeable visual effects such as flicker. It is noted that the driver 30 may alternatively switch from the healing state directly to the measuring state again.

When operating in the healing state, the driver 30 generates a healing voltage signal $V_H$ (line 46 in FIG. 3B). Several variations are possible for this healing voltage signal $V_H$, as will be explained later.

As a result from this healing voltage signal $V_H$, the OLED 20 switches to its healthy state. This can be established in the next measuring state, when the driver 30 finds that the sensed measuring current $I_M$ is lower than the threshold current level Ith (see FIG. 3B).

The healing voltage signal $V_H$ may for instance be a continuous voltage of a fixed value. FIG. 3B illustrates an embodiment where the healing voltage signal $V_H$ has a fixed value higher than the normal operating voltage $V_N$, for instance 5 V. It is also possible that the healing voltage signal $V_H$ consists of a train of voltage pulses of continuous or increasing or decreasing height. It is also possible that the healing voltage signal $V_H$ consists of a voltage sweep, i.e. a continuous voltage of an increasing or decreasing magnitude. The healing voltage may have the same sign as the normal operating voltage $V_N$, as in the example of FIG. 3B, but it is also possible that the healing voltage has a sign opposite to the sign of the normal operating voltage $V_N$. For a specific OLED, it is possible that different signal types can be used, but one signal type may work better than another signal type. In any case, once a suitable signal type has been found for a specific OLED, this signal type remains useable for this specific OLED for the remainder of its lifetime. In any case, during the experiments performed by the inventor, no indications were found that an OLED responsive to a certain signal type ceased to be responsive to this signal type after some time.

Thus, in an embodiment where the driver 30 and OLED 20 are dedicated to each other as from their manufacturing (i.e. they belong together), the driver 30 can be optimized for cooperation with this specific OLED 20. The manufacturer can store information defining parameters of an optimum (or at least suitable) healing signal into a memory 37 associated with the driver 30, and the driver 30 generates its healing voltage on the basis of the information in the memory 37.

It is, however, also possible that the driver 30 is a general driver that is to be paired to an OLED later so that it should be capable of cooperating with any specific OLED. In that case, there is no knowledge in advance as to the parameters of the optimum (or at least effective) healing voltage. However, it is possible to define in advance a plurality of possibly effective healing signals, and the memory 37 can contain information defining these signals. The driver 30 can try these signals, in any order, as should be clear to a person skilled in the art. Once the driver 30 has found an effective healing signal, it can mark this signal in the memory 37 so as to use (or at least try first) the same healing signal the next time when a healing signal is needed, based on the assumption that it will still be dealing with the same OLED.

In a preferred embodiment, the driver 30 is programmed to try the following types of healing signals in the following order.

First, the driver 30 may try a voltage sweep in a predefined voltage range. The voltage sweep may be from lower voltage to higher voltage. The range may for instance be from about 1.8 V to about 3.0 V; preferably, the range should at least comprise the range from 2.2-2.5 V. In any case, this range should be lower than the normal operating voltage and should have the same sign as the normal operating voltage.

Second, the driver 30 may try a voltage pulse or a series of voltage pulses in the voltage range mentioned above.

Third, the driver 30 may try a voltage pulse or a series of voltage pulses in a voltage range higher than the normal operating voltage and having the same sign as the normal operating voltage; preferably, the voltage pulses should have a magnitude of about 5 V.

Fourth, in the exceptional cases that the driver can find no effective healing signal of any of the above three types, the driver 30 may try voltage signals as mentioned of the above three types, but now of opposite polarity.

Figure 4:
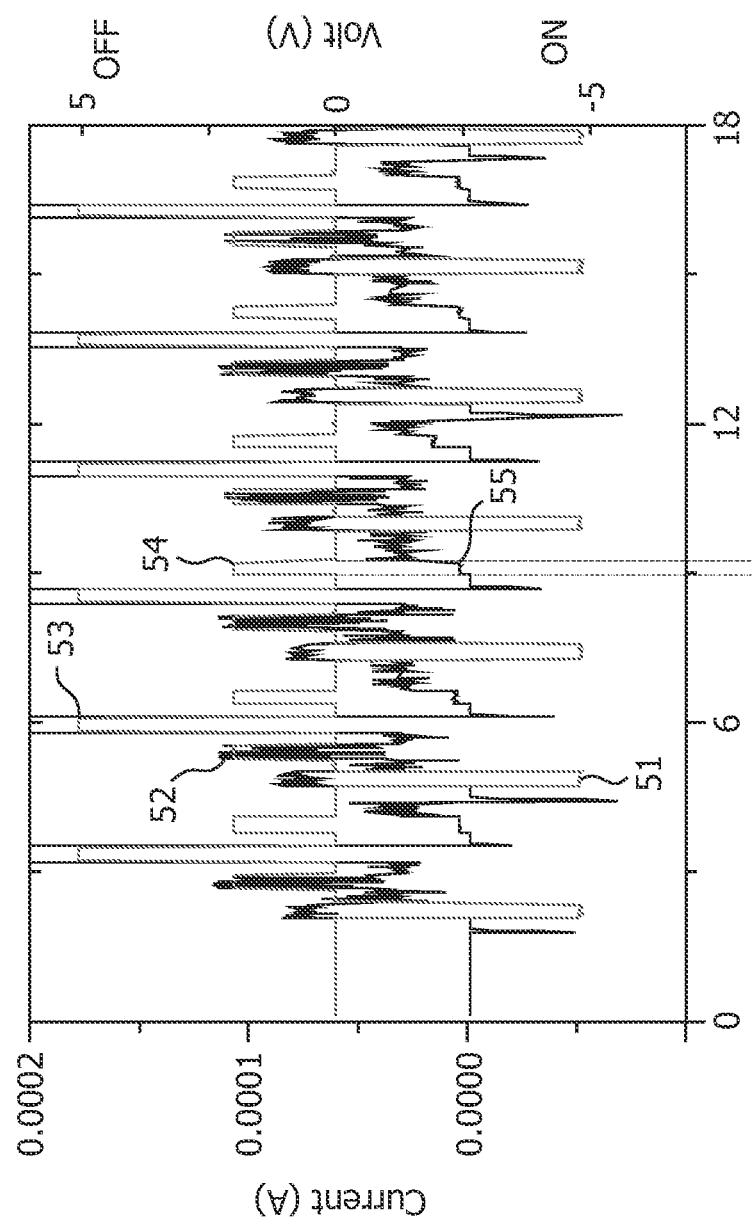
FIG. 4 is a graph schematically showing the results of an experiment.

FIG. 4 is a graph schematically showing the results of an experiment to prove that it was possible to reliably detect a faulty OLED and to switch this OLED reliably back to its healthy state. The figure shows the voltage applied to this OLED, and the resulting OLED current, as a function of time.

It appeared to be possible for this specific OLED to be switched to a faulty state by applying a voltage pulse of −5 V (indicated at 51). 52 indicates the subsequent measuring voltage $V_M$ at +2 V; it can be seen that the OLED current is relatively high, in the order of 0.1 mA in this state.

53 indicates a healing voltage pulse of +5 V. The resulting current at that moment is beyond the upper limit of this drawing. 54 indicates the subsequent measuring voltage $V_M$ at +2 V; it can be seen at 55 that the current is much lower now, in the order of 0.01 mA.

It is noted that after this healing voltage pulse the voltage returns to 0 V. One would expect now a current of 0 mA, but the figure shows a noisy current at a level of about 0.03 mA. This current is to be seen as a flaw of the measuring circuit, particularly the analog to digital conversion thereof.

Summarizing, the present invention provides a driver 30 for driving an OLED 20, which comprises:
output terminals 31, 32;
a current sensor 35 sensing the output current;
a sensor input 33 coupled to the current sensor;
a reference signal source 36 providing a reference signal Sref indicating a threshold current level Ith.

In a normal operating state N, a normal operating voltage VN and a normal operating current IN are generated.

In a measuring state M, a measuring voltage VM lower than the normal operating voltage is generated, the sensor signal is compared with the reference signal, and it is determined whether the OLED current is higher than said threshold current level.

In a healing state H, a healing voltage signal VH is generated.

If it is determined that the OLED current is higher than said threshold current level, the driver is designed to briefly operate in the healing state.

It is noted that, using the present invention allows to monitor and, if necessary, heal an OLED during its operation, i.e. without having to switch it off.

While the invention has been illustrated and described in detail in the drawings and foregoing description, it should be clear to a person skilled in the art that such illustration and description are to be considered illustrative or exemplary and not restrictive. The invention is not limited to the disclosed embodiments; rather, several variations and modifications are possible within the protective scope of the invention as defined in the appending claims.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. Any reference signs in the claims should not be construed as limiting the scope.

In the above, the present invention has been explained with reference to block diagrams, which illustrate functional blocks of the device according to the present invention. It is to be understood that one or more of these functional blocks may be implemented in hardware, where the function of such functional block is performed by individual hardware components, but it is also possible that one or more of these functional blocks are implemented in software, so that the function of such functional block is performed by one or more program lines of a computer program or a programmable device such as a microprocessor, microcontroller, digital signal processor, etc.

The invention claimed is:

1. Driver for driving an OLED, the driver comprising:
output terminals for connecting to the OLED;
a current sensor arranged for sensing an output current provided to the OLED;
a sensor input coupled to the current sensor for receiving a measuring signal from the current sensor;
a reference signal source for providing a reference signal indicating a threshold current level;
the driver being configured to operate in a normal operating state, in which the driver is configured to generate at the output terminals a normal operating voltage and a normal operating current for the OLED;
the driver being configured to operate in a measuring state, in which the driver is configured to generate at the output terminals a measuring voltage having an absolute value that is lower than the normal operating voltage, to compare the sensor signal with the reference signal, and to determine whether the OLED current is higher than or lower than said threshold current level;
the driver being configured to operate in a healing state, in which the driver is designed to generate at the output terminals a healing voltage signal;
wherein the driver is configured, while operating in the normal operating state, to briefly operate in the measuring state, and, if it is determined that the OLED current is higher than said threshold current level, to briefly operate in the healing state.

2. Driver according to claim 1, wherein the healing voltage signal includes a continuous voltage higher than the normal operating voltage and having the same polarity.

3. Driver according to claim 1, wherein the healing voltage signal includes a continuous voltage having a polarity opposite to the normal operating voltage.

4. Driver according to claim 1, wherein the healing voltage signal includes a train of voltage pulses of continuous or increasing or decreasing height.

5. Driver according to claim 1, wherein the healing voltage signal includes a voltage sweep.

6. Driver according to claim 1, wherein the driver is provided with a memory containing information defining parameters of a plurality of possibly effective healing signals, and wherein the driver is configured, while operating in the healing state, to successively try different healing signals, to measure the healing effect while operating in a next measuring state, and if a successful healing signal is found, to mark this signal in the memory.

7. Driver according to claim 6, wherein the driver is designed to always use the healing signal that is marked in the memory.

8. Driver according to claim 6, wherein the driver is designed to successively try different healing signals while first trying the healing signal that is marked in the memory.

9. Driver according to claim 1, wherein the measuring voltage and the normal operating voltage have a common polarity.

10. Driver according to claim 1, wherein the value of the measuring voltage is less than or equal to half of the normal operating voltage.

11. Driver for driving an OLED, the driver comprising:
output terminals for connecting to the OLED;
a current sensor arranged for sensing an output current provided to the OLED;
a sensor input coupled to the current sensor for receiving a measuring signal from the current sensor;
a reference signal source for providing a reference signal indicating a threshold current level;
the driver being configured to operate in a normal operating state, in which the driver is configured to generate at the output terminals a normal operating voltage and a normal operating current for the OLED;
the driver being configured to operate in a measuring state, in which the driver is configured to generate at the output terminals a measuring voltage having an absolute value that is lower than the normal operating voltage, to compare the sensor signal with the reference signal, and to determine whether the OLED current is higher than or lower than said threshold current level;
the driver being configured to operate in a healing state, in which the driver is designed to generate at the output terminals a healing voltage signal;
wherein the driver is configured, while operating in the normal operating state, to briefly operate in the measuring state, and, if it is determined that the OLED current is higher than said threshold current level, to briefly operate in the healing state,
wherein the driver is provided with a memory containing information defining parameters of an optimum healing signal for a specific OLED, and wherein the driver is configured, while operating in the healing state, to generate the healing voltage signal on the basis of the information in the memory.

\* \* \* \* \*